United States Patent
Blanton et al.

(10) Patent No.: US 10,450,082 B1
(45) Date of Patent: Oct. 22, 2019

(54) SENSOR-BASED GUIDANCE FOR ROTORCRAFT

(71) Applicant: The Boeing Company, Chicago, IL (US)

(72) Inventors: Brendan Blanton, Wilmington, DE (US); Katherine Gresko, Abington, PA (US); Deanna Dibernardi, Newtown Square, PA (US); Timothy Paul, Gilbertsville, PA (US); Joseph Kenney, Media, PA (US); Robert Allen, Glen Mills, PA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/973,213

(22) Filed: May 7, 2018

(51) Int. Cl.
*B64D 43/00* (2006.01)
*B64D 47/08* (2006.01)
*G08G 5/00* (2006.01)
*B64D 1/22* (2006.01)

(52) U.S. Cl.
CPC .............. *B64D 43/00* (2013.01); *B64D 1/22* (2013.01); *B64D 47/08* (2013.01); *G08G 5/0047* (2013.01)

(58) Field of Classification Search
None
See application file for complete search history.

(56) References Cited

U.S. PATENT DOCUMENTS

| | | | |
|---|---|---|---|
| 7,679,528 B1* | 3/2010 | Etherington | G01S 1/70 340/945 |
| 8,643,850 B1* | 2/2014 | Hartman | G01S 5/163 342/29 |
| 9,223,008 B1* | 12/2015 | Hartman | G01S 5/163 |
| 10,176,722 B1 | 1/2019 | Boyd et al. | |
| 2010/0039294 A1* | 2/2010 | Feyereisen | G06K 9/0063 340/972 |
| 2011/0121997 A1 | 5/2011 | Paines | |
| 2011/0192932 A1* | 8/2011 | Brenner | B64C 27/04 244/17.13 |
| 2012/0007979 A1* | 1/2012 | Schneider | G01J 3/36 348/116 |
| 2014/0336848 A1* | 11/2014 | Saund | G08G 1/054 701/3 |
| 2015/0232198 A1* | 8/2015 | Seibt | B64D 47/02 362/470 |

(Continued)

OTHER PUBLICATIONS https://www.youtube.com/watch?v=HPheWEOc0e8 accessed May 7, 2018.

(Continued)

*Primary Examiner* — Rebecca A Volentine
(74) *Attorney, Agent, or Firm* — Kunzler Bean & Adamson

(57) ABSTRACT

Disclosed herein is a method that comprises acquiring one or more images of an off-board signal source using a camera onboard a rotorcraft. The off-board signal source comprises a beacon array, which comprises at least two beacons. The method also comprises processing, using an image processor, the one or more images of the beacon array to identify one or more coded signals that are propagated from the off-board signal sour. The method further comprises decoding the one or more coded signals to identify information for providing guidance to an operator of the rotorcraft.

20 Claims, 6 Drawing Sheets

(56) References Cited

U.S. PATENT DOCUMENTS

| | | | |
|---|---|---|---|
| 2016/0009393 A1* | 1/2016 | Repp | B64D 1/22 |
| | | | 701/34.4 |
| 2016/0306363 A1 | 10/2016 | Wang et al. | |
| 2017/0045894 A1 | 2/2017 | Canoy et al. | |
| 2017/0278403 A1 | 9/2017 | Pitcher et al. | |
| 2017/0291707 A1* | 10/2017 | Veronesi | B64C 19/00 |
| 2018/0159303 A1* | 6/2018 | Kim | F21V 5/043 |
| 2018/0293902 A1 | 10/2018 | Lieberman et al. | |

OTHER PUBLICATIONS https://www.youtube.com/watch?v=FgPMcJUuO8g accessed May 7, 2018.

Pradana, Design and Implementation of Visible Light Communication System Using Pulse Width Modulation, The 5th International Conference on Electrical Engineering and Informatics, Aug. 10, 2015, pp. 25-30, Ball Indonesia.

* cited by examiner

US 10,450,082 B1

SENSOR-BASED GUIDANCE FOR ROTORCRAFT

FIELD

This disclosure relates generally to rotorcraft guidance systems, and more particularly to using sensor data to provide guidance information to a rotorcraft operator.

BACKGROUND

Communications between an aircrew and a ground crew often involves the use of radios and/or hand signals (aircraft marshalling) to guide a rotorcraft such as a helicopter to a desired location. Under certain situations, radio communication is not effective due to the noisy environment that the rotorcraft generates and hand signals may be confused or misinterpreted. Furthermore, a rotorcraft operator may not have constant and clear visibility with a ground crew member who is providing the hand signals.

SUMMARY

The subject matter of the present application has been developed in response to the present state of the art, and in particular, in response to the problems and disadvantages associated with conventional systems for providing ground-to-air guidance information. Accordingly, the subject matter of the present application has been developed to provide ground-to-air guidance information that overcomes at least some of the above-discussed shortcomings of prior art techniques.

Disclosed herein is a method that comprises acquiring one or more images of an off-board signal source using a camera onboard a rotorcraft. The off-board signal source comprises a beacon array, which comprises at least two beacons. The method also comprises processing, using an image processor, the one or more images of the beacon array to identify one or more coded signals that are propagated from the off-board signal sour. The method further comprises decoding the one or more coded signals to identify information for providing guidance to an operator of the rotorcraft. The preceding subject matter of this paragraph characterizes example 1 of the present disclosure.

The method further comprises providing the coded signals, comprising the guidance information, to the off-board signal source using an operator interface. The preceding subject matter of this paragraph characterizes example 2 of the present disclosure, wherein example 2 also includes the subject matter according to example 1, above.

The operator interface comprises one of an interface located on the off-board signal source or an interface that is communicatively coupled to the off-board signal source. The preceding subject matter of this paragraph characterizes example 3 of the present disclosure, wherein example 3 also includes the subject matter according to example 2, above.

The method further comprises displaying the guidance information to the operator of the rotorcraft on a display of the rotorcraft. The guidance information is displayed as one or more of textual information and graphical information. The preceding subject matter of this paragraph characterizes example 4 of the present disclosure, wherein example 4 also includes the subject matter according to any one of examples 1-3, above.

The method further comprises providing the guidance information to the operator of the rotorcraft as audio information. The preceding subject matter of this paragraph characterizes example 5 of the present disclosure, wherein example 5 also includes the subject matter according to any one of examples 1-4, above.

The guidance information comprises one or more of direction information, navigation information, map information, and schedule information. The preceding subject matter of this paragraph characterizes example 6 of the present disclosure, wherein example 6 also includes the subject matter according to any one of examples 1-5, above.

The method according to claim 1, further comprising authenticating an identity of the off-board signal source prior to acquiring one or more images of the off-board signal source using the camera. The preceding subject matter of this paragraph characterizes example 7 of the present disclosure, wherein example 7 also includes the subject matter according to any one of examples 1-6, above.

The one or more coded signals are propagated using one or more of ultraviolet light, visible light, infrared light, and short wave infrared light. The preceding subject matter of this paragraph characterizes example 8 of the present disclosure, wherein example 8 also includes the subject matter according to any one of examples 1-7, above.

The off-board signal source is located within view of the camera on one of a helmet of a ground crew member, a ground location proximate to the rotorcraft, and a different aircraft. The preceding subject matter of this paragraph characterizes example 9 of the present disclosure, wherein example 9 also includes the subject matter according to any one of examples 1-8, above.

The camera is located on the bottom of the rotorcraft. The preceding subject matter of this paragraph characterizes example 10 of the present disclosure, wherein example 10 also includes the subject matter according to any one of examples 1-9, above.

The camera comprises a wide-angle lens. The preceding subject matter of this paragraph characterizes example 11 of the present disclosure, wherein example 11 also includes the subject matter according to any one of examples 1-10, above.

Further disclosed herein is a system that comprises a rotorcraft and a camera onboard the rotorcraft. The system further comprises an image processor for processing images that the camera acquires. The system additionally comprises an off-board signal source, which comprises a beacon array. The beacon array comprises at least two beacons. The system also comprises a controller configured to acquire one or more images of the off-board signal source using the camera. The controller is also configured to process, using the image processor, the one or more images of the beacon array to identify one or more coded signals that are propagated from the off-board signal source. The controller is further configured to decode, using the image processor, the one or more coded signals to identify information for providing guidance to an operator of the rotorcraft. The preceding subject matter of this paragraph characterizes example 12 of the present disclosure.

The coded signals, comprising the guidance information, are provided to the off-board signal source using an operator interface. The operator interface comprises one of an interface located on the off-board signal source or an interface that is communicatively coupled to the off-board signal source. The preceding subject matter of this paragraph characterizes example 13 of the present disclosure, wherein example 13 also includes the subject matter according to example 12, above.

The controller is further configured to display the guidance information to the operator of the rotorcraft on a display of the rotorcraft. The guidance information is displayed as one or more of textual information and graphical information. The preceding subject matter of this paragraph characterizes example 14 of the present disclosure, wherein example 14 also includes the subject matter according to any one of examples 12-13, above.

The controller is further configured to provide the guidance information to the operator of the rotorcraft as audio information. The preceding subject matter of this paragraph characterizes example 15 of the present disclosure, wherein example 15 also includes the subject matter according to any one of examples 12-14, above.

The guidance information comprises one or more of direction information, navigation information, map information, and schedule information. The preceding subject matter of this paragraph characterizes example 16 of the present disclosure, wherein example 16 also includes the subject matter according to any one of examples 12-15, above.

The controller is further configured to authenticate an identity of the off-board signal source prior to acquiring one or more images of the off-board signal source using the camera. The preceding subject matter of this paragraph characterizes example 17 of the present disclosure, wherein example 17 also includes the subject matter according to any one of examples 12-16, above.

The one or more coded signals are propagated using one or more of ultraviolet light, visible light, infrared light, and short ware infrared light. The preceding subject matter of this paragraph characterizes example 18 of the present disclosure, wherein example 18 also includes the subject matter according to any one of examples 12-17, above.

The off-board signal source is located within view of the camera on one of a helmet of a ground crew member, a ground location proximate to the rotorcraft, and a different aircraft. The preceding subject matter of this paragraph characterizes example 19 of the present disclosure, wherein example 19 also includes the subject matter according to any one of examples 12-18, above.

Also disclosed herein is an apparatus that comprises an image capturing module configured to acquire one or more images of an off-board signal source using a camera onboard a rotorcraft. The off-board signal source comprises a beacon array, which is comprised of at least two beacons. The apparatus also comprises an image processing module configured to process, using an image processor, the one or more images of the beacon array to identify one or more coded signals that are propagated from the off-board signal source. The apparatus further comprises a signal decoding module configured to decode, using the image processor, the one or more coded signals to identify information for providing guidance to an operator of the rotorcraft. The preceding subject matter of this paragraph characterizes example 20 of the present disclosure.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
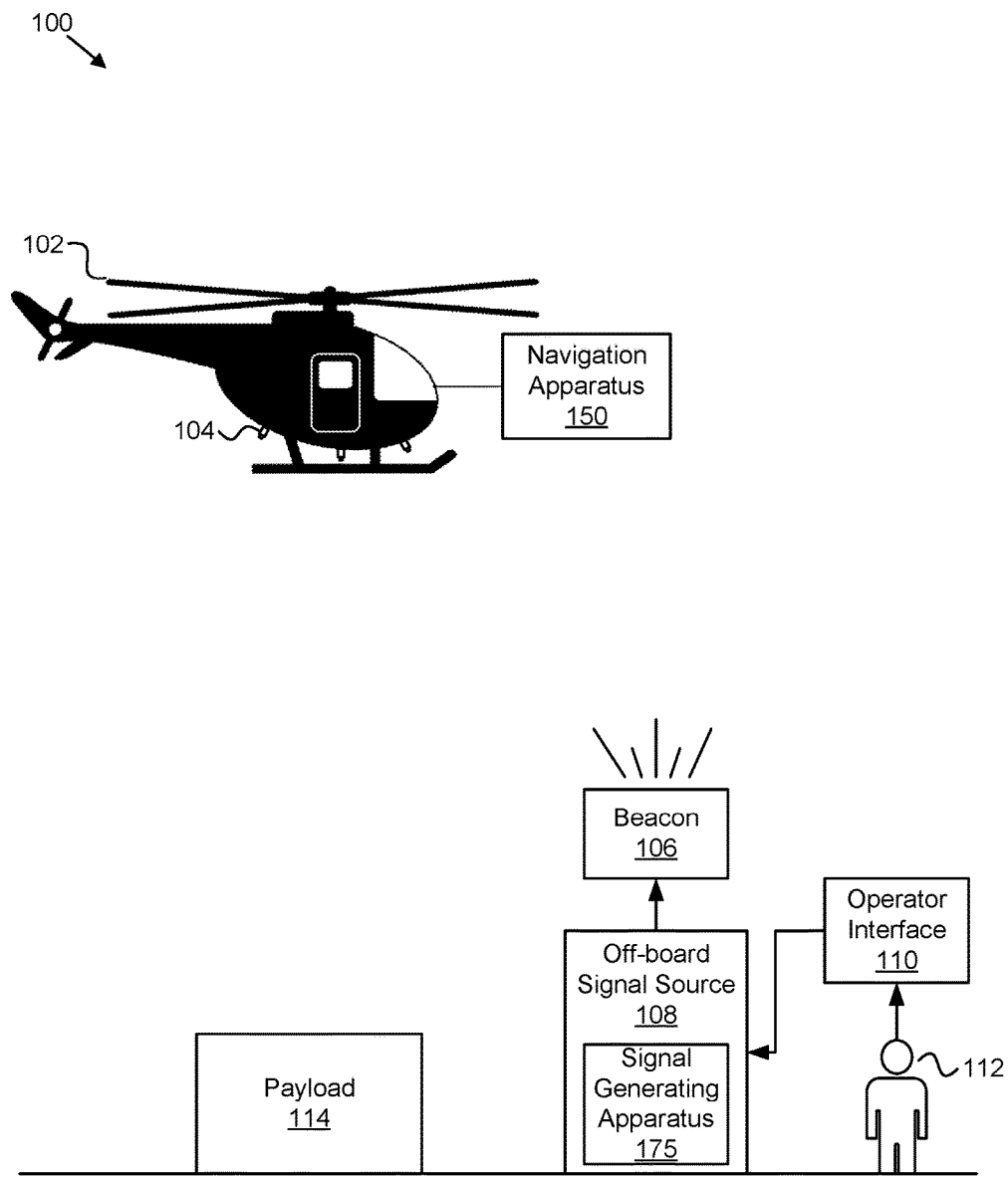
FIG. 1 is a schematic block diagram of a system for sensor-based guidance for rotorcraft, according to one or more examples of the present disclosure.

FIG. 1 is a schematic block diagram illustrating one embodiment of a system 100 for sensor-based guidance for rotorcraft. The system 100, in one embodiment, includes a rotorcraft 102. As used herein, a rotorcraft 102 is a heavier-than-air flying machine that uses lift generated by wings, called rotary wings or rotor blades that revolve around a mast. Several rotor blades mounted on a single mast are referred to as a rotor. Rotorcraft include aircraft where one or more rotors are required to provide lift, e.g., helicopters, tiltrotor aircraft, cyclocopters, autogyros, and gyrodynes. Some rotorcraft also include additional thrust engines or propellers.

In one embodiment, the system 100 includes one or more camera devices 104 that are mounted onboard the rotorcraft 102. In certain embodiments, the camera devices 104 are mounted onboard the rotorcraft 102 in such a way as to capture data, e.g., images, from the ground, from other aircraft in close proximity to the rotorcraft 102, and/or the like. For example, the rotorcraft 102 may include a camera 104 that is mounted to the belly of the rotorcraft 102 to capture images of objects on the ground that may not be visible to the rotorcraft operator.

The camera devices 104, in various embodiments, include digital cameras or video cameras that are configured to capture image data transmitted using a signal bandwidth that includes ultraviolet light, visible light, or infrared light (e.g., long wave or short wave infrared light). In one embodiment, the camera device 104 includes a wide angle lens, or other similar lens for capturing a wide view of a scene. In certain embodiments, the rotorcraft 102 may include one camera 104 or multiple cameras 104 onboard its body for capturing images.

In one embodiment, the system 100 includes a beacon 106 that is configured to generate (e.g., present, display, emit, and/or the like) visual coded signals provided by a user 112 associated with the beacon 106. For instance, the beacon 106 may comprise, or otherwise be part of, an array of a plurality of beacons 106, such as an array of light emitting diodes (LEDs), that are selectively activated (see, e.g., activated beacon 402) to provide a visual representation of a command, message, code, and/or the like that the user 112 provides, which is described in more detail below with reference to FIG. 4.

In one embodiment, the beacon 106 may be placed at a stationary location on the ground so that it is visible to the camera 104 mounted onboard the rotorcraft 102. In other embodiments, the beacon 106 may be mounted on a user 112, e.g., on a user's helmet or shoulder, on a different aircraft, on a ground-based vehicle, and/or the like as long as the beacon 106 is visible to one or more cameras 104 mounted on board the rotorcraft 102.

In one embodiment, the beacon 106 is communicatively coupled to an off-board signal source 108. For instance, the beacon 106 may be connected to the off-board signal source 108 over a data network (e.g., a wired or wireless computer network). In certain embodiments, the beacon 106 is integrated into the off-board signal source 108 so that the beacon 106 and off-board signal source 108 are a single unit.

In one embodiment, the off-board signal source 108 is a computing device such as a desktop computer, a laptop computer, a tablet computer, a smart phone, a smart watch, a fitness band or other wearable activity tracking device, an optical head-mounted display (e.g., a virtual reality headset, smart glasses, or the like), a High-Definition Multimedia Interface ("HDMI") or other electronic display dongle, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium.

In one embodiment, the off-board signal source 108 includes an instance of a signal generating apparatus 175. The signal generating apparatus 175, in certain embodiments, is configured to receive a command, message, signal, code, and/or the like from the operator interface 110. The command, message, signal, code, and/or the like may be provided to the operator interface 110 by the user 112, and may comprise ground-to-air information (e.g., direction information, guidance information, navigation information, schedule information, map information, and/or the like) intended for the rotorcraft operator to use to maneuver the rotorcraft 102.

The operator interface 110, in one embodiment, is embodied as a computer device such as a desktop computer, a laptop computer, a tablet computer, a smart phone, a smart watch, a fitness band or other wearable activity tracking device, an optical head-mounted display (e.g., a virtual reality headset, smart glasses, or the like), a High-Definition Multimedia Interface ("HDMI") or other electronic display dongle, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium.

The operator interface 110 may include an interface for receiving user input and various input mechanisms such as a touch screen or other touch-enabled display, a keyboard, a stylus, a mouse, a microphone for receiving voice input, and/or the like. The operator interface 110, in certain embodiments, is communicatively connected to the off-board signal source 108 over a data network, e.g., a wired or wireless computer network. In certain embodiments, the operator interface 110 is integrated into the off-board signal source 108 such that the operator interface 110 and the off-board signal source 108 are a single unit.

In further embodiments, the signal generating apparatus 175 is configured to generate a code that represents the command, e.g., encode the command into a format that the beacon 106 can read and display. The signal generating apparatus 175, in various embodiments, is configured to present the encoded command on the beacon 106 so that it can be viewed and captured by the camera 104 on the rotorcraft 102.

The rotorcraft 102, in one embodiment, includes an instance of a navigation apparatus 150. The navigation apparatus 150, in various embodiments, is configured to receive (e.g., acquire, capture, and/or the like) one or more images propagated by the beacon 106, or beacon array, of the off-board signal source 108. In certain embodiments, the navigation apparatus 150 is configured to process, using an image processor, the one or more acquired images of the beacon array to identify one or more coded signals, and decode the one or more coded signals to identify guidance information to the operator of the rotorcraft 102.

In one embodiment, the navigation apparatus 150 and the signal generating apparatus 175 provide improvements over conventional systems for providing guidance information to rotorcraft operators from the ground and/or from a different aircraft. For instance, in conventional systems, an aircrew, e.g., the crew in the rotorcraft 102, may communicate with a ground crew, e.g., one or more users 112 on the ground, with radios, aircraft marshalling, and/or the like to guide a rotorcraft 102 into a desired location for landing, payload 114 pickup, payload 114 drop off, and/or the like. Aircraft marshalling, as used herein, includes using hand signals to replace radio communications because rotorcraft 102 may be noisy and make it difficult for the radio communications to be clearly transmitted and received. Regardless, there may be situations where the rotorcraft operator does not have continuous clear vision of the aircraft marshaller, the desired location, and/or the like due to operational and/or environmental circumstances. Furthermore, because conventional systems rely on ground crew providing hand signals to aircrew observers, who then relay this information to the rotorcraft operator, e.g., over an intercom, inherent risks are present in the form of confused commands, latent commands, and/or the like.

The navigation apparatus 150 and the signal generating apparatus 175, in one embodiment, overcome the shortcomings of conventional guidance systems for rotorcraft 102 by providing direct communication to the rotorcraft operator by way of a coded guidance signal propagated using a beacon 106 or a beacon array. An image of the beacon 106 or beacon array is captured, decoded, and presented to the rotorcraft operator such that there is minimal latency between the rotorcraft operator and the users 112 on the ground who are providing the guidance information. Furthermore, the navigation apparatus 150 and the signal generating apparatus 175 reduces or eliminates errors or misinterpretations of guidance commands that the users 112 on the ground provide.

In various embodiments, the navigation apparatus 150 and/or the signal generating apparatus 175 may be embodied as a hardware appliance that can be installed or deployed on a computing device. In certain embodiments, the navigation apparatus 150 and/or the signal generating apparatus 175 may include a hardware device such as a secure hardware dongle or other hardware appliance device (e.g., a set-top box, a network appliance, or the like) that attaches to a computing device either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the navigation apparatus 150 and/or the signal generating apparatus 175 may include a power interface, a wired and/or wireless network interface, a graphical interface that attaches to a display, and/or a semiconductor integrated circuit device as described below, configured to perform the functions described herein with regard to the navigation apparatus 150 and/or the signal generating apparatus 175.

The navigation apparatus 150 and/or the signal generating apparatus 175, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the navigation apparatus 150 and/or the signal generating apparatus 175 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the navigation apparatus 150 and/or the signal generating apparatus 175.

The semiconductor integrated circuit device or other hardware appliance of the navigation apparatus 150 and/or the signal generating apparatus 175, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the navigation apparatus 150 and/or the signal generating apparatus 175 includes and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

As mentioned above, the payload 114 may be the desired location for the rotorcraft 102. The payload 114 may be associated with various scenarios that require the rotorcraft 102 to hover such as sling load operations, hoist operations, medevac/police operations, firefighting operations, flood relief operations (e.g., sandbag placement), utility maintenance (e.g., power line inspection/repair/install), ski landings in rocky terrain/soft snow, landing hazard detection (e.g., slopes, rocks, holes, obstacles), inflight checks, and/or the like. These scenarios require communication between rotorcraft operators and other crew members (e.g., ground crew, hoist operators, or the like) to compensate for obstructed views, limited situational awareness, and/or the like. The navigation apparatus 150 and/or the signal generating apparatus 175 enhance the safety, efficiency, and performance of the operations being performed by using sensor data to receive accurate guidance, directional, navigational, or the like information for the rotorcraft operator 102 instead of relying on verbal commands or hand gestures that can be confused, erroneously interpreted, and/or the like.

Figure 2:
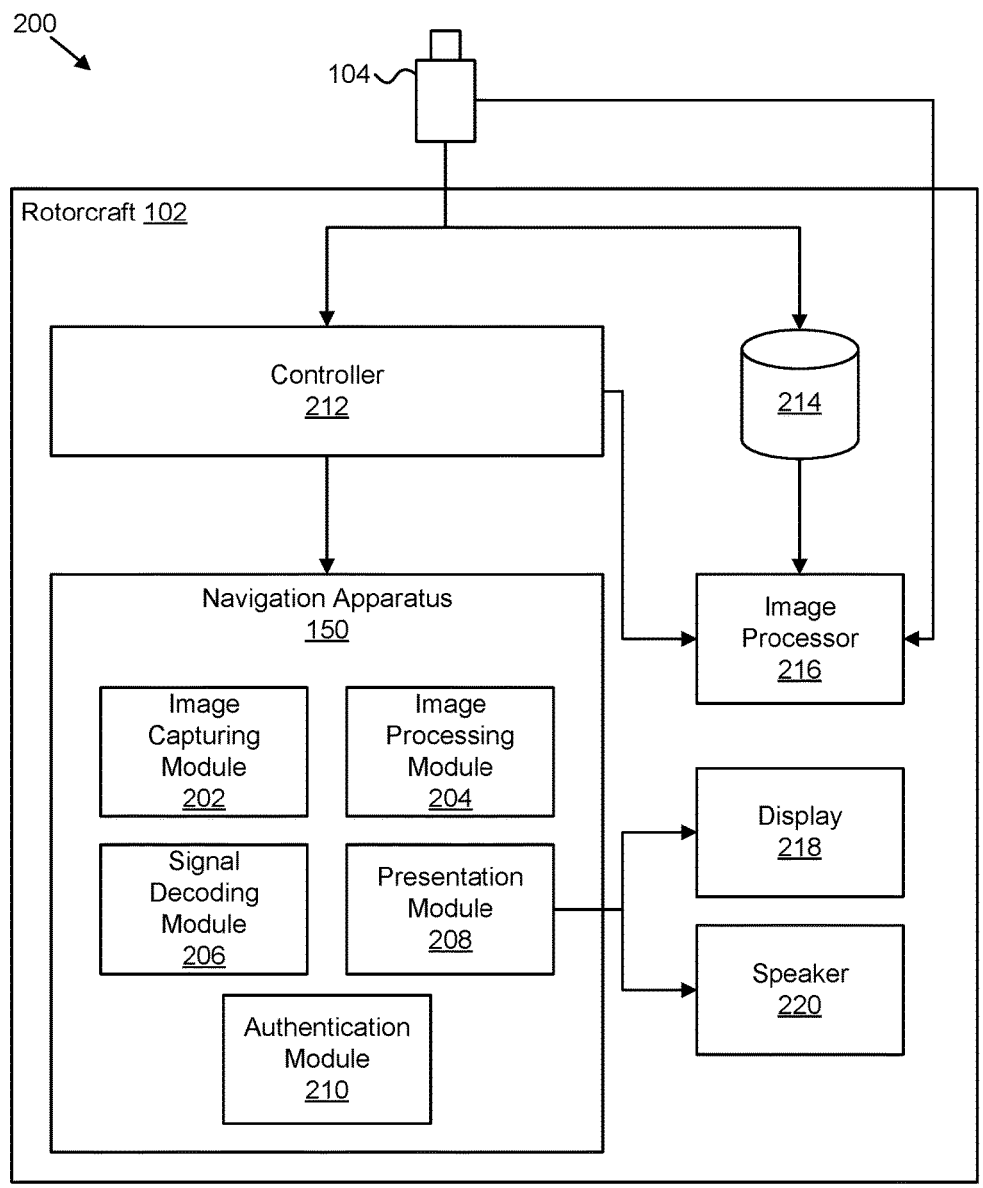
FIG. 2 is a schematic block diagram of a system for sensor-based guidance for rotorcraft, according to one or more examples of the present disclosure.

FIG. 2 depicts one embodiment of a system 200 for sensor-based guidance for rotorcraft. In one embodiment, the system 200 includes a rotorcraft 102, a camera 104 onboard the rotorcraft 102, as described above, a controller 212, a database 214, an image processor 216, a display 218, a speaker 220, and a navigation apparatus 150, which are described in more detail below.

The camera 104, as described above, is configured to capture one or more images of a coded signal propagated by a beacon 106 or beacon array, e.g., a beacon array pointed towards the direction of a hovering or flying helicopter. The controller 212 may control how the camera 104 operates, e.g., how often the camera 104 takes images, the resolution of the images, and/or other image capturing settings of the camera 104. The controller 212 may also manage transfer and storage of the captured images. For example, the controller 212 may transfer images that the camera 104 acquires to a database 214.

In one embodiment, the database 214 comprises a data store, a relational database, an image database, and/or the like that is configured to store images that the camera 104 captures. In certain embodiments, the database 214 stores images using non-volatile storage, e.g., a hard disk drive so that the images are persistently stored. In other embodiments, the database 214 stores images using volatile memory, e.g., RAM, so that the images are stored until power to the system 200 is shut off.

In one embodiment, the navigation apparatus 150 includes one or more of an image capturing module 202, an image processing module 204, a signal decoding module 206, a presentation module 208, and an authentication module 210, which are described in more detail below.

In one embodiment, the image capturing module 202 is configured to acquire one or more images of an off-board signal source 108 using the camera 104 that is onboard the rotorcraft 102. As described above, the off-board signal source 108 includes a beacon 106 or a beacon array that includes at least two beacons 106. In one embodiment, the image capturing module 202 is in communication with the controller 212 to acquire the one or more images of the beacon array.

For instance, the image capturing module 202 sends a signal, request, command, and/or the like to the controller 212 to instruct the controller 212 to capture an image with the camera 104. In some embodiments, the image capturing module 202 sends a signal, request, command, and/or the like to the controller 212 to instruct the controller 212 to retrieve an image, e.g., the most recently captured image from the database 214.

In one embodiment, the image processing module 204 is configured to process the one or more acquired images of the beacon 106 or beacon array to identify one or more coded signals, commands, messages, and/or the like that are propagated from the off-board signal source 108. For instance, in certain embodiments, the image processing module 204 may use an image processor 216, e.g., a processor that is dedicated, hard-wired, specially programmed, and/or the like for performing video and image processing such as a digital signal processor to analyze the acquired images and determine if there is are coded signals in the images.

For example, the image processor 216 may recognize in an image of a beacon array which beacons 106 of the beacon array are active and the locations within the beacon array of the active beacons 106. The image processing module 204 may then determine whether the active beacons 106 of the beacon array correspond to a predetermined coded signal, command, message, and/or the like.

The signal decoding module 206, in one embodiment, is configured to decode the one or more coded signals, commands, messages, and/or the like to identify information for providing guidance to a rotorcraft operator. For example, the signal decoding module 206 may determine a direction, e.g., left, right, up, down, forward, back, etc., that corresponds to a coded signal.

In one embodiment, the signal decoding module 206 may compare the image of the coded signal to one or more predefined images of coded signals to determine the corresponding information that the coded signal is associated with. For instance, the coded signal of an image of the beacon array depicted in FIG. 4 may correspond to a predefined coded signal for the "back" direction. The dark beacons of the array may represent inactive or unlit beacons and the light beacons may represent active or lit beacons. The predefined coded signals may be stored in the database 214 or other data store of the rotorcraft 102. Other information may include navigation information, e.g., GPS information, map information, schedule information, e.g., time for pick up at a particular location, and/or the like. For example, the coded signal of an image for the beacon array may indicate a GPS coordinate, a link to a map, a time, a location, and/or the like.

The presentation module 208, in one embodiment, is configured to provide the decoded guidance information to the rotorcraft operator in real-time. For instance, the presentation module 208 may display the guidance information on a device display 218, e.g., a computer device display, a heads-up display, and/or the like in a text format and/or a graphical format. For example, the presentation module 208 may display the word "left" if the guidance information instructs the operator to maneuver the rotorcraft 102 to the left. In another example, the presentation module 208 may present a graphical arrow or other symbol to indicate the "left" direction. In one embodiment, the presentation module 208 provides an audio version of the guidance information to the rotorcraft operator through one or more speakers 220, e.g., through a headset or other speaker proximate to the operator's location.

The authentication module 210, in one embodiment, is configured to authenticate an identity of the off-board signal source 108 prior to acquiring one or more images of the off-board signal source 108 using the camera 104. For instance, the authentication module 210 may perform one or more handshaking operations with the off-board signal source 108, over a short-range data network such as Bluetooth, near-field communication, and/or the like to verify the identity of the off-board signal source 108 and determine whether the off-board signal source 108 is an authorized device configured to provide guidance information for the rotorcraft 102.

Figure 3:
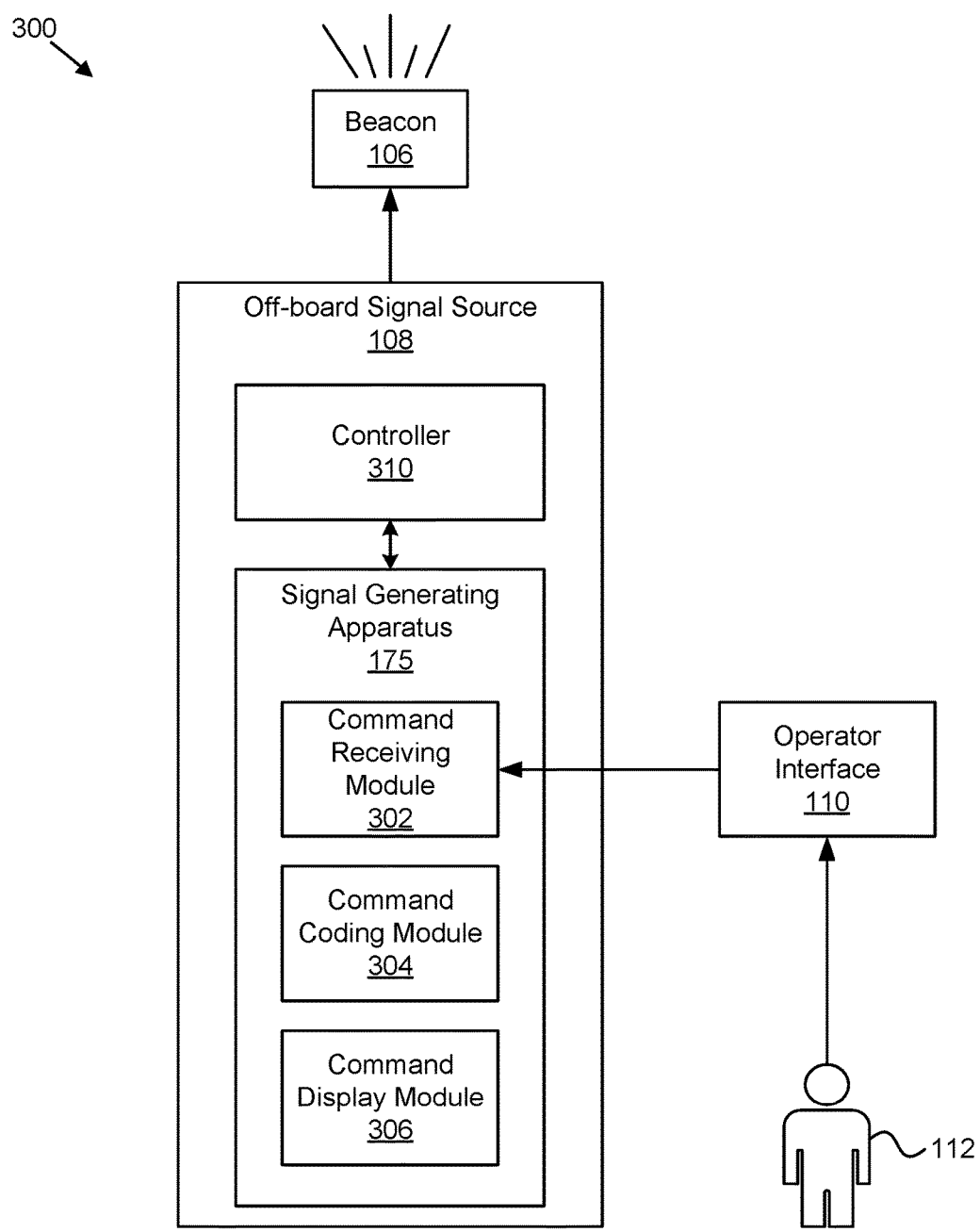
FIG. 3 is a schematic block diagram of a system for sensor-based guidance for rotorcraft, according to one or more examples of the present disclosure.

FIG. 3 depicts one embodiment of a system 300 for sensor-based guidance for rotorcraft. In one embodiment, the system 300 includes a beacon 106, or an array of beacons, an off-board signal source 108, an operator interface 110, and a user 112, which may be substantially similar to like-numbered elements depicted in FIG. 1. Furthermore, the off-board signal source 108, in certain embodiments, includes a controller 310, and a signal generating apparatus 175. The signal generating apparatus 175, in various embodiments, includes a command receiving module 302, a command coding module 304, and a command display module 306, which are described in more detail below.

The controller 310, in one embodiment, is configured to control the beacon 106, or each beacon 106 of a beacon array. For instance, the controller 310 may be configured to control individual beacons 106 of a beacon array by activating or deactivating particular beacons 106 of the beacon array in response to signals or triggers from the signal generating apparatus 175.

In one embodiment, the command receiving module 302 is configured to receive a guidance command, signal, message, and/or other guidance-related information from the operator interface 110 as entered by the user 112. For example, the guidance command may include a direction for the rotorcraft operator to maneuver the rotorcraft 102 such as "left," "right," "up," "down," "forward," "back," or the like. Other guidance commands may include GPS coordinates, map information, or the like for a location where user 112 wants the rotorcraft 102 to go, scheduling information for pickups or drop-offs, and/or the like.

The command coding module 304, in one embodiment, is configured to encode the received guidance command to a format that the beacon array can present to the rotorcraft 102, e.g., for the rotorcraft camera 104 to capture an image of the coded signal as presented on the beacon array. The command coding module 304, for instance, may check a predetermined list of guidance commands and their corresponding encodings to determine how to encode the guidance command that is received from the operator interface 110. In other embodiments, the command coding module 304 may encode the guidance command using a series of different encodings. For example, if the guidance command is a GPS coordinate, the command coding module 304 may encode the GPS coordinates as a series of coded signals, e.g., one for a latitude coordinate and one for a longitude coordinate, which the camera 104 takes a separate image of. In such an embodiment, each coded signal may include a reference number indicating its position in the series, e.g., 1 of 3, 2 of 3, etc.

The command display module 306, in one embodiment, is configured to present the coded guidance signals on the beacon 106 or beacon array for the camera 104 onboard the rotorcraft 102 to acquire an image of. For instance, the command display module 306 may send the coded signals to the controller 310, which activates the corresponding beacons 106 of the beacon array for the camera 104 to capture an image of.

Figure 4:
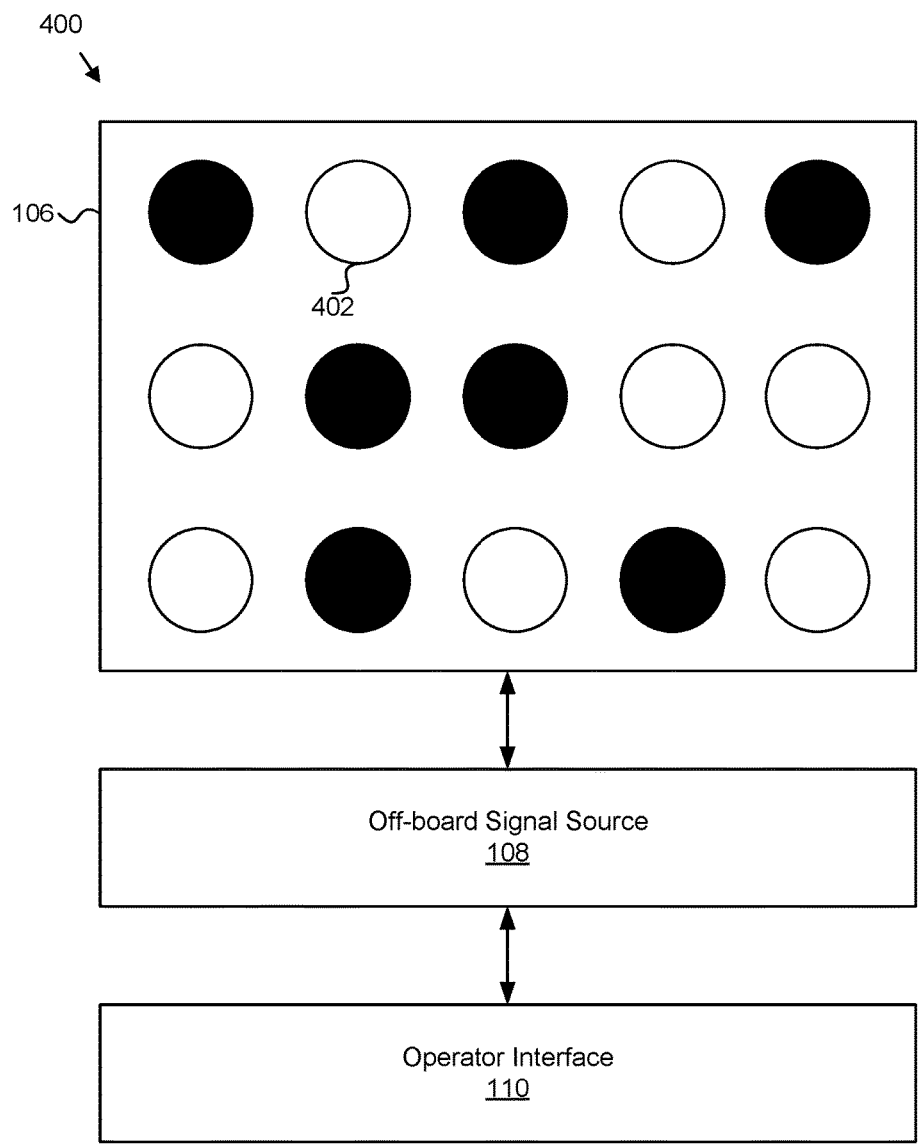
FIG. 4 is a schematic block diagram of a beacon array for sensor-based guidance for rotorcraft, according to one or more examples of the present disclosure.

FIG. 4 is a schematic block diagram of a beacon array 400 for sensor-based guidance for rotorcraft. In one embodiment, the beacon array 400 includes a plurality of beacons 106 that are selectively enabled/disabled, activated/deactivated, and/or the like. For example, the illustration depicted in FIG. 4 may be an encoded signal for the guidance command "up," to indicate to the rotorcraft to move in an upward direction. Accordingly, the controller 310 of the off-board signal source 108 may selectively activate and deactivate various beacons 106 of the beacon array 400 to achieve the desired pattern for the coded guidance command. The beacons 106 may be configured to emit or propagate a signal with a bandwidth that include ultraviolet light, visible light, infrared light, short-wave infrared light, and/or the like.

Figure 5:
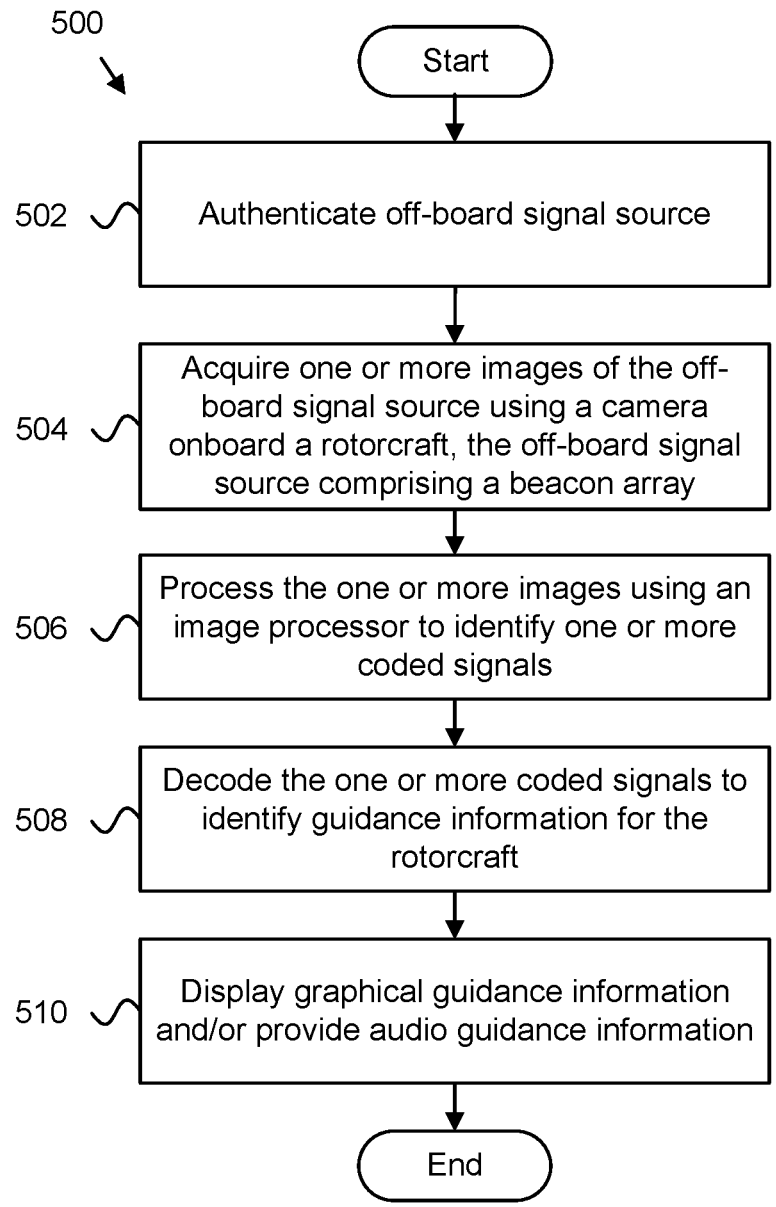
FIG. 5 is a schematic flow diagram of a method for sensor-based guidance for rotorcraft, according to one or more examples of the present disclosure.

FIG. 5 is a schematic flow diagram of a method 500 for sensor-based guidance for rotorcraft. In one embodiment, the method 500 begins and authenticates 502 an off-board signal source 108. In further embodiments, the method 500 acquires 504 one or more images of the off-board signal source 108 using a camera 104 onboard a rotorcraft 102. In some embodiments, the off-board signal source 108 comprises a beacon array.

In various embodiments, the method 500 processes 506 the one or more images using an image processor 216 to identify one or more coded signals in the one or more images. In certain embodiments, the method 500 decodes 508 the one or more coded signals to identify guidance information for the rotorcraft 102. In one embodiment, the method 500 displays 510 graphical guidance information and/or provides audio guidance information to the rotorcraft operator, and the method 500 ends.

Figure 6:
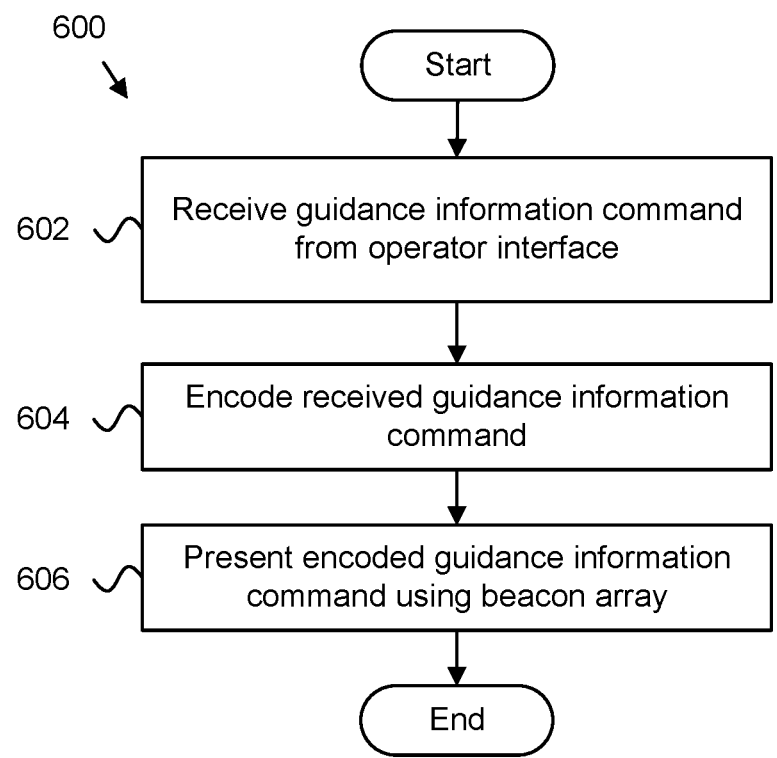
FIG. 6 is a schematic flow diagram of a method for sensor-based guidance for rotorcraft, according to one or more examples of the present disclosure.

FIG. 6 is a schematic flow diagram of a method 600 for sensor-based guidance for rotorcraft. In one embodiment, the method 600 begins and receives 602 a guidance information command from an operator interface 110. In certain embodiments, the method 600 encodes 604 the received guidance information command. In further embodiments, the method 600 presents 606 the encoded guidance information command to the rotorcraft 102, and more particularly, the camera 104 onboard the rotorcraft 102 using a beacon array, and the method 600 ends.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Embodiments of the various modules may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

The modules may be implemented as a hardware circuit comprising custom very-large-scale integration (VLSI) circuits or gate arrays, off-the-shelf semiconductors such as logic chips, transistors, or other discrete components. The modules may also be implemented in programmable hardware devices such as field programmable gate arrays, programmable array logic, programmable logic devices or the like.

The modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized by the modules. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A method, comprising:
    acquiring one or more images of an off-board signal source using a camera onboard a rotorcraft, the off-board signal source comprising a beacon array, the beacon array comprising at least two beacons;
    processing, using an image processor, the one or more images of the beacon array to identify one or more coded signals that are propagated from the off-board signal source, the one or more coded signals comprising directional information for the rotorcraft relative to a payload that is obstructed from view of an operator of the rotorcraft, the one or more coded signals inputted by a ground crew member assisting the operator of the rotorcraft in picking up the payload;
    decoding the one or more coded signals to identify the directional information for the operator of the rotorcraft; and
    providing the directional information to the operator of the rotorcraft.

2. The method according to claim 1, further comprising providing the coded signals, comprising the guidance information, to the off-board signal source using an operator interface.

3. The method according to claim 2, wherein the operator interface comprises one of an interface located on the off-board signal source or an interface that is communicatively coupled to the off-board signal source.

4. The method according to claim 1, wherein providing the directional information to the operator of the rotorcraft comprises displaying the guidance information to the operator of the rotorcraft on a display of the rotorcraft, the guidance information being displayed as one or more of textual information and graphical information.

5. The method according to claim 1, wherein providing the guidance information to the operator of the rotorcraft comprises providing the guidance information as audio information to the operator of the rotorcraft.

6. The method according to claim 1, wherein the guidance information further comprises one or more of navigation information, map information, and schedule information.

7. The method according to claim 1, further comprising authenticating an identity of the off-board signal source prior to acquiring one or more images of the off-board signal source using the camera.

8. The method according to claim 1, wherein the one or more coded signals are propagated using one or more of ultraviolet light, visible light, infrared light, and short wave infrared light.

9. The method according to claim 1, wherein the off-board signal source is located within view of the camera on one of a helmet of a ground crew member, a ground location proximate to the rotorcraft, and a different aircraft.

10. The method according to claim 1, wherein the camera is located on the bottom of the rotorcraft.

11. The method according to claim 1, wherein the camera comprises a wide-angle lens.

12. A system, comprising:
a rotorcraft;
a camera onboard the rotorcraft;
an image processor for processing images that the camera acquires;
an off-board signal source, the off-board signal source comprising a beacon array, the beacon array comprising at least two beacons; and
a controller, the controller configured to:
acquire one or more images of the off-board signal source using the camera;
process, using the image processor, the one or more images of the beacon array to identify one or more coded signals that are propagated from the off-board signal source, the one or more coded signals comprising directional information for the rotorcraft relative to a payload that is obstructed from view of an operator of the rotorcraft, the one or more coded signals inputted by a ground crew member assisting the operator of the rotorcraft in picking up the payload;
decode, using the image processor, the one or more coded signals to identify the directional information for the operator of the rotorcraft; and
provide the directional information to the operator of the rotorcraft.

13. The system according to claim 12, wherein the coded signals comprising the guidance information are provided to the off-board signal source using an operator interface, the operator interface comprising one of an interface located on the off-board signal source or an interface that is communicatively coupled to the off-board signal source.

14. The system according to claim 12, wherein the controller is further configured to display the guidance information to the operator of the rotorcraft on a display of the rotorcraft, and wherein the guidance information is displayed as one or more of textual information and graphical information.

15. The system according to claim 12, wherein the controller is further configured to provide the guidance information to the operator of the rotorcraft as audio information.

16. The system according to claim 12, wherein the guidance information comprises one or more of navigation information, map information, and schedule information.

17. The system according to claim 12, wherein the controller is further configured to authenticate an identity of the off-board signal source prior to acquiring one or more images of the off-board signal source using the camera.

18. The system according to claim 12, wherein the one or more coded signals are propagated using one or more of ultraviolet light, visible light, infrared light, and short ware infrared light.

19. The system according to claim 12, wherein the off-board signal source is located within view of the camera on one of a helmet of a ground crew member, a ground location proximate to the rotorcraft, and a different aircraft.

20. An apparatus, comprising:
an image capturing module configured to acquire one or more images of an off-board signal source using a camera onboard a rotorcraft, the off-board signal source comprising a beacon array, the beacon array comprising at least two beacons;
an image processing module configured to process, using an image processor, the one or more images of the beacon array to identify one or more coded signals that are propagated from the off-board signal source, the one or more coded signals comprising directional information for the rotorcraft relative to a payload that is obstructed from view of an operator of the rotorcraft, the one or more coded signals inputted by a ground crew member assisting the operator of the rotorcraft in picking up the payload;
a signal decoding module configured to decode, using the image processor, the one or more coded signals to identify the directional information for the operator of the rotorcraft; and
a presentation module configured to provide the directional information to the operator of the rotorcraft.

* * * * *